United States Patent
Nachtigall (10) Patent No.: US 12,553,347 B2
(45) Date of Patent: Feb. 17, 2026

(54) CLAMPING COMPOSITE ASSEMBLY

(71) Applicant: MTU Aero Engines AG, Munich (DE)

(72) Inventor: Hermann Nachtigall, Munich (DE)

(73) Assignee: MTU Aero Engines AG, Munich (DE)

( * ) Notice: Subject to any disclaimer, the term of this patent is extended or adjusted under 35 U.S.C. 154(b) by 0 days.

(21) Appl. No.: 19/058,724

(22) Filed: Feb. 20, 2025

(65) Prior Publication Data
US 2025/0270934 A1 Aug. 28, 2025

(51) Int. Cl.
F01D 5/06 (2006.01)
F01D 5/02 (2006.01)

(52) U.S. Cl.
CPC ............. F01D 5/066 (2013.01); F01D 5/025 (2013.01); *F05D 2260/30* (2013.01)

(58) Field of Classification Search
CPC ....... F01D 5/066; F01D 5/025; F05D 2260/30
See application file for complete search history.

(56) References Cited

U.S. PATENT DOCUMENTS

| | | | |
|---|---|---|---|
| 5,173,024 A | 12/1992 | Mouchel et al. | |
| 5,472,313 A | 12/1995 | Quinones et al. | |
| 6,575,703 B2 * | 6/2003 | Simeone | F01D 11/006 416/220 R |
| 8,579,538 B2 * | 11/2013 | Juh | F01D 5/066 403/359.5 |
| 8,662,845 B2 * | 3/2014 | Virkler | F01D 5/066 415/115 |
| 8,840,375 B2 | 9/2014 | Virkler | |
| 9,371,863 B2 * | 6/2016 | Juh | F16D 1/04 |
| 9,945,237 B2 * | 4/2018 | Partyka | F01D 5/12 |
| 10,309,251 B2 * | 6/2019 | Sandoval | F01D 5/3015 |
| 10,436,151 B2 * | 10/2019 | Miller | F02C 3/04 |
| 10,975,707 B2 | 4/2021 | Paradis et al. | |
| 2003/0017050 A1 * | 1/2003 | Simeone | F01D 5/066 416/220 R |

(Continued)

FOREIGN PATENT DOCUMENTS

| | | |
|---|---|---|
| DE | 60205993 T2 | 7/2006 |
| EP | 1277917 B1 | 9/2005 |

(Continued)

*Primary Examiner* — Eldon T Brockman
(74) *Attorney, Agent, or Firm* — Hinckley, Allen & Snyder, LLP; David R. Josephs (57) ABSTRACT

The invention relates to a clamping composite assembly, wherein the clamping assembly comprises a first component with a first flange with first radial webs and first recesses between every two first webs adjacent in the circumferential direction; a second component with a second flange with second radial webs and second recesses between every two second webs adjacent in the circumferential direction; and a third component with a third flange; the first and second components are designed such that in an initial installation position the first and second components have a first angular position relative to one another around an installation and/or longitudinal axis of the clamping composite and by axially displacing the first and second components relative to one another parallel to this axis the second webs can be guided through the first recesses and the first webs can be guided through the second recesses in the axial direction.

12 Claims, 4 Drawing Sheets

(56) References Cited

U.S. PATENT DOCUMENTS

| | | | |
|---|---|---|---|
| 2012/0244004 A1* | 9/2012 | Virkler | F01D 5/08 29/888.012 |
| 2015/0377041 A1 | 12/2015 | Partyka et al. | |
| 2016/0003097 A1 | 1/2016 | Sandoval et al. | |

FOREIGN PATENT DOCUMENTS

| | | | |
|---|---|---|---|
| EP | 2971693 | B1 | 9/2017 |
| EP | 2971690 | B1 | 10/2017 |

\* cited by examiner

CLAMPING COMPOSITE ASSEMBLY

BACKGROUND OF THE INVENTION

The present invention relates to a clamping composite (assembly), in particular a clamping composite rotor and/or for a gas turbine, as well as a gas turbine assembly, in particular a turbine or compressor assembly and/or an aircraft engine, with the clamping composite assembly, in particular the clamping composite rotor, and a method for installing or dismantling the clamping composite assembly or the clamping composite rotor.

In particular, rotors can be designed in the form of a clamping composite or in a tie rod or tension rod design. In this case, (rotor) components are axially clamped one behind the other with one or more tension rods. Due to the axial pressing force of the tension rod(s), the components of such a clamping composite assembly, in particular a clamping composite rotor, form a closed unit in terms of the geometry and the force flow, torques being transmitted via the frictional connection.

Due to the high axial forces often encountered, a design that ensures appropriate force flow in the components and has favorable interfaces is advantageous; high-angle cones and/or radial offsets between the components are advantageously avoided or cone angles or radial offsets are reduced. This competes with axially and/or radially limited installation space, so that it is sometimes not possible to achieve a force flow in the design adapted to the tension rod principle.

SUMMARY OF THE INVENTION

One object of an embodiment of the present invention is to improve a clamping composite assembly or the installation and/or dismantling thereof. This object is achieved by a clamping composite assembly or by a method of the present invention. Another object is to provide a gas turbine assembly with a clamping composite assembly as described here.

According to one embodiment of the present invention, a clamping composite assembly, in a particularly preferred development a clamping composite rotor, has a component with a flange with, preferably at least four, in particular at least 10, radial webs and recesses between every two adjacent webs in the circumferential direction, which is/are referred to here without restriction of generality as the first component or first flange or first webs or recesses, wherein the first component in turn can be composed of one or more individual parts.

According to one embodiment of the present invention, the clamping composite assembly has an additional component with a flange preferably having at least four, in particular at least 10, radial webs and recesses between every two adjacent webs in the circumferential direction, which is/are referred to here without restriction of generality as a second component or second flange or second webs or recesses, wherein the second component in turn can be composed of one or more individual parts.

According to one embodiment of the present invention, the clamping composite assembly has an additional component with a flange, which is referred to here without restriction of generality as a third component or third flange, wherein the third component in turn can be composed of one or more individual parts.

According to one embodiment of the present invention, the first and second components are designed such that in an initial installation position, the first and second components have a first angular position relative to one another around an installation and/or longitudinal axis of the clamping composite, in a further development a rotational axis of the rotor, and by an axial displacement of the first and second components relative to one another parallel to this axis, in particular an axial displacement of the first component relative to the fixed second component or of the second component relative to the fixed first component or an axial displacement of both the first and the second component, the second webs can be guided through the first recesses and, preferably at the same time or at least partially at the same time, the first webs can be guided through the second recesses in the axial direction.

According to one embodiment of the present invention, when the clamping composite assembly is installed, the first and second components have a second angular position relative to one another around the installation and/or longitudinal axis of the clamping composite (rotated relative to the first angular position, preferably by at least 1°, in particular, preferably at least 2°, and/or at most 30°, in particular, preferably at most 15°, and/or rotated by at least 90°/(maximum of the number of webs evenly distributed over the circumference) and/or by at most 180°/(maximum of the number of webs evenly distributed over the circumference)), in a further development, axis of rotation of the rotor, in which the second webs engage behind the first webs in the circumferential direction or completely or partially cover them, and the second webs are arranged in the axial direction between the first webs and the third flange and are clamped by a tension rod device of the rotor (axially, preferably against each other), in a further development the webs of the first component, webs of the second component and the third flange are pressed against each other in this sequence in the axial direction by means of the tension rod device, preferably contacting each other under corresponding contact pressure.

In one embodiment, the overall length can be advantageously reduced by clamping the first component, in a further development an impulse stage of a gas turbine, via its first flange and the friction connection continues to be achieved by means of the tension rod force, so that in one embodiment no additional local screw connection is necessary.

According to one embodiment of the present invention, the first and second flanges or the webs and recesses of the first and second components form a bayonet geometry or bayonet kinematics or bayonet construction.

In particular, this also enables or simplifies installation if, in one embodiment, a maximum outer diameter of the first flange is greater than a minimum inner diameter of a constriction, in one embodiment of a section, in particular a (radial) projection, of the second component that projects radially inwards to a maximum extent in a further embodiment, and the first flange is arranged at a distance from the constriction in the axial direction (in case of an installed clamping composite assembly or for installing the clamping composite assembly) between the constriction and the second flange: the first component or its first flange can thus be inserted in the first angular position from the side facing away from the constriction and, after this insertion, can be rotated into the second angular position and clamped against the second flange by the tension rod device.

An axial direction mentioned here is, in one embodiment, parallel to a clamping composite or the installation and/or longitudinal axis of the clamping composite, in particular the axis of rotation of the rotor, whereby this axis is, in one embodiment, parallel to a (main) clamping direction of the tension rod device. A circumferential direction mentioned here is, in one embodiment, a circumferential or rotational direction around this installation or longitudinal or rotational axis, a radial direction mentioned here, in one embodiment, is perpendicular to the axis and circumferential direction, preferably pointing away from or originating from the axis. Accordingly, in one embodiment, the installation axis is an axis or the axis along which the webs of the first and second flange can be guided through, in bayonet kinematics, and around which they can then be rotated, in bayonet kinematics, or along which they are guided through and around which they are then rotated.

In one embodiment, the tension rod device has one or more, preferably tubular, tension rods. Additionally or alternatively, in one embodiment, the tension rod device passes through the first flange, preferably the first component, and/or the second flange, preferably the second component, and/or the third flange, preferably the third component, in the axial direction. Additionally or alternatively, in one embodiment, the tension rod device is supported in the axial direction directly or indirectly on one of the sides of the first component facing away from the third component and/or on one of the sides of the third component facing away from the first component.

As a result, particularly in each case, a combination of two or more of these features can be realized in an advantageous, in particular, a reliable and/or space-saving design which can be installed or removed easily and which is suitable for the force flow.

In one embodiment, the first recesses are through holes (in the axial direction) and/or radial that open outwards. In addition or alternatively, in one embodiment, the second recesses are through holes (in the axial direction) and/or radial that open inwards. In addition or alternatively, in one embodiment, the second component overlaps the first webs in the axial direction, preferably radially outwards. As a result, particularly in each case, a combination of two or more of these features can be realized in an advantageous, in particular, a reliable and/or space-saving design which can be installed or dismantled easily and which is suitable for the force flow.

In one embodiment, the clamping composite assembly has axial webs which (in case of an installed clamping composite assembly or while installing the clamping composite assembly) engage in the first and/or second recesses, preferably pass through the first and/or second recesses. In this way, an advantageous anti-twisting protection can be realized.

In a further development, two or more of these axial webs are connected to each other or are designed as an integral unit. Additionally or alternatively, in a further development, two or more of the axial webs are arranged on the third component, in one embodiment connected to it or designed as an integral unit. Additionally or alternatively, in a further development, two or more of the axial webs are arranged on an additional component, in one embodiment arranged on a separate ring, in one embodiment connected to it or designed as an integral unit. In this way a particularly advantageous, reliable and/or space-saving anti-twist protection can be realized which is easy to install or dismantle and which is suitable for the force flow.

In an alternative embodiment, the axial webs on the third component can also be designed as separate components (instead of integral). For this purpose, holes can be made in the third component on the axial web position. In this case, specially shaped stud bolts (pre-screwed on the side facing away from the flange) mounted through the hole can work as the anti-twist protection.

In one embodiment, the clamping composite assembly has a zero-play radial fit between the second flange, preferably its second webs, and the first component. In a further development, the first component has one or more corresponding mating or contact surface(s) which fits the second flange, preferably its second webs, to form a zero-play radial fit or (in each case) a snug fit. In one embodiment, the first recesses protrude radially beyond the mating or contact surface(s), so that the passage of the second webs is made easier and the zero-play radial fit is only formed by rotating from the first to the second angular position.

Additionally or particularly advantageously (to avoid a double-fit), the clamping composite assembly has a zero-play radial fit between the first flange, preferably its first webs, and the second component. In a further development, the second component has one or more corresponding mating or contact surface(s) which fits the first flange, preferably its first webs, to form a zero-play radial fit or (in each case) a snug fit. In one embodiment, the second recesses protrude radially beyond these mating or contact surface(s), so that the passage of the first webs is made easier and the zero-pay radial fit is only formed by rotating from the first to the second angular position.

A zero-play radial fit between a flange of one of the first and second components and the other of the first and second components, results in a particularly advantageous, reliable and/or space-saving design which is easy to install or remove and which is suitable for the force flow.

The mating seats do not have to be cut free so that the recesses protrude radially beyond the mating or contact surface(s). In particular, the first component can also have a cylindrical and/or ring-like mating surface with which the second flange, preferably its second webs, forms a zero-play radial fit or (each) mating seat and/or the second component can also have a cylindrical and/or ring-like mating surface with which the first flange, preferably its first webs, forms a zero-play radial fit or (each) mating seat. In particular, it can be advantageous for this purpose to temper these components accordingly for installation in order to facilitate or enable an installation gap for guiding the webs through the recesses.

In one embodiment, the clamping composite assembly has a fourth component with a fourth radial flange, which is arranged in the axial direction on a side of the third flange facing away from the first and/or second flange, wherein the first webs, second webs, the third flange and the fourth flange are clamped by the tension rod device. This advantageously allows longer and/or more complex clamping composite assemblies, in particular clamping composite rotors with multiple disks, preferably rotating blade disks which are easy to manufacture and to install.

In one embodiment, the third component secures the second component in an installed clamping composite assembly by means of a radial form-fit; in a further development, at least one outer axial projection is arranged on the third flange, which radially covers the second flange externally. This ensures a particularly advantageous, reliable and/or space-saving design which is easy to install or remove and which is suitable for the force flow.

In one embodiment, the first component is an end component and/or a cone. Additionally or alternatively, in one embodiment, the second component is a rotor disk and/or is designed to support rotating blades of the gas turbine; in a further development, it has corresponding interfaces for this purpose, for example grooves for fastening the rotating blades or similar, and/or is equipped with rotating blades that are integrally formed with the second component or can be fastened to it in a material or form-fitting manner. Additionally or alternatively, in one embodiment, the third component is a rotor disk and/or is designed to support rotating blades of the gas turbine; in a further development, it has corresponding interfaces for this purpose, for example grooves for fastening the rotating blades or similar, and/or is equipped with rotating blades that are integrally formed with the third component or can be fastened to it in a material or form-fitting manner. Additionally or alternatively, in one embodiment, the fourth component is a rotor disk and/or is designed to support blades of the gas turbine; in a further development, it has corresponding interfaces for this purpose, for example grooves for fastening the blades or similar, and/or is equipped with blades that are integrally formed with the fourth component or can be fastened to it in a material or form-fitting manner. The present invention is particularly advantageous for such components, in particular due to the installation conditions and/or dynamic and/or thermal operating conditions and/or spatial boundary conditions.

The present invention is particularly suitable for gas turbines, accordingly, an embodiment of the present invention relates to a gas turbine assembly, in a further development a turbine or compressor assembly of a gas turbine assembly and/or a gas turbine assembly, in a further development turbine or compressor assembly, of an aircraft engine, with a clamping composite assembly described here, preferably a clamping composite rotor described here.

According to one embodiment of the present invention, a method for installing a clamping composite assembly described here, in a further development of a clamping composite rotor described here, comprises the steps:
  Arranging the first and second components in the initial assembly position;
  Displacing the first and second components relative to each other parallel to the installation and/or longitudinal axis of the clamping composite, in particular the axis of rotation of the rotor, so that the second webs are guided through the first recesses and the first webs through the second recesses in the axial direction;
  Rotating the first and second components relative to each other about this axis into the second angular position;
  Arranging the third component, preferably after rotating; and clamping the second webs in the axial direction between the first webs and the third flange by means of the tightening rod device.

In one embodiment, the fourth component is arranged and then the first webs, second webs, the third flange and the fourth flange are clamped by the tension rod device.

According to one embodiment of the present invention, a method for dismantling a clamping composite assembly described here, in a further development of a clamping composite rotor described here, comprises the steps:
  Loosen the clamping of the second webs in the axial direction between the first webs and the third flange caused by the tightening rod device;
  Remove the third component, preferably before rotating as mentioned below;
  Rotating the first and second components relative to each other around the installation and/or longitudinal axis of the clamping composite into the first angular position;
  Displacing the first and second components relative to each other parallel to this axis, so that the second webs are guided through the first recesses and the first webs through the second recesses in the axial direction and;
  Separating the first component and the second component from each other.

In one embodiment, the second recesses are wider in the circumferential direction than the first webs and/or first recesses. Additionally or alternatively, in one embodiment, the second webs are narrower in the circumferential direction than the first recesses.

In this way, particularly in combination with two or more of these features, a particularly advantageous, reliable and/or space-saving anti-twist protection can be realized which is easy to install or remove and which is suitable for the force flow.

BRIEF DESCRIPTION OF THE DRAWINGS FIGURES

Further advantageous developments of the present invention arise out of the subclaims and the following description of preferred embodiments. To this end, partially schematically:

DESCRIPTION OF THE INVENTION

Figure 1:
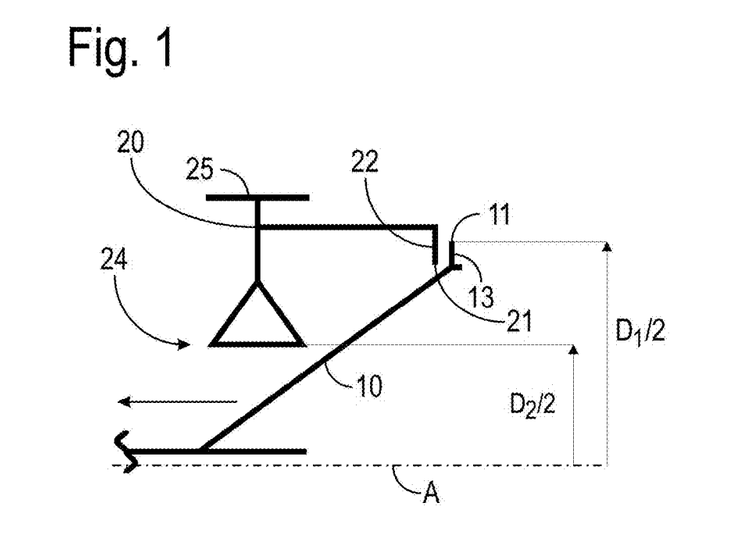
FIG. 1 is an installation step of a clamping composite rotor according to an embodiment of the present invention in an axial section.
Figure 2:
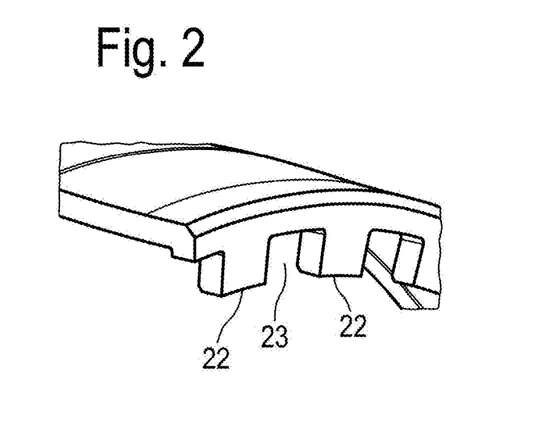
FIG. 2 is a part of a second component of the rotor in a sectioned perspective view.

FIG. 1 shows an installation step of a clamping composite rotor according to an embodiment of the present invention in an axial section. A horizontal assembly or longitudinal or rotation axis A of the clamping composite rotor is indicated in dash-dotted lines in FIG. 1.

In FIG. 1, a first component in the form of an (end) cone 10 with a first flange 11 with first radial webs 12 and first recesses 13 between two circumferentially adjacent first webs 12 and a second component in the form of a rotating blade disk 20 with a second flange 21 with second radial webs 22 and second recesses 23 between two circumferentially adjacent second webs 22 are arranged in an initial installation position.

As indicated in FIG. 1 by an installation or left arrow, the two components 10, 20 are displaced in the axial direction (horizontally in FIG. 1). The second webs 22 are guided through the first recesses 13 and the first webs 12 through the second recesses 23 in the axial direction.

Figure 3:
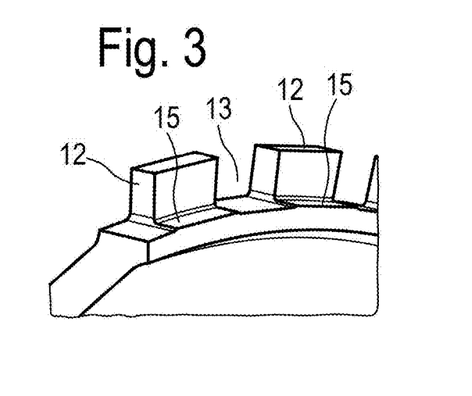
FIG. 3 is a part of a first component of the rotor in a sectioned perspective view.
Figure 4:
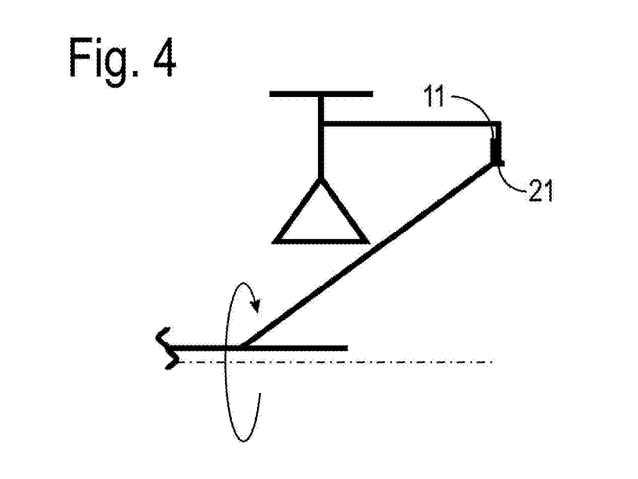
FIG. 4 is a subsequent installation step in FIG. 1 corresponding illustration.
Figure 5:
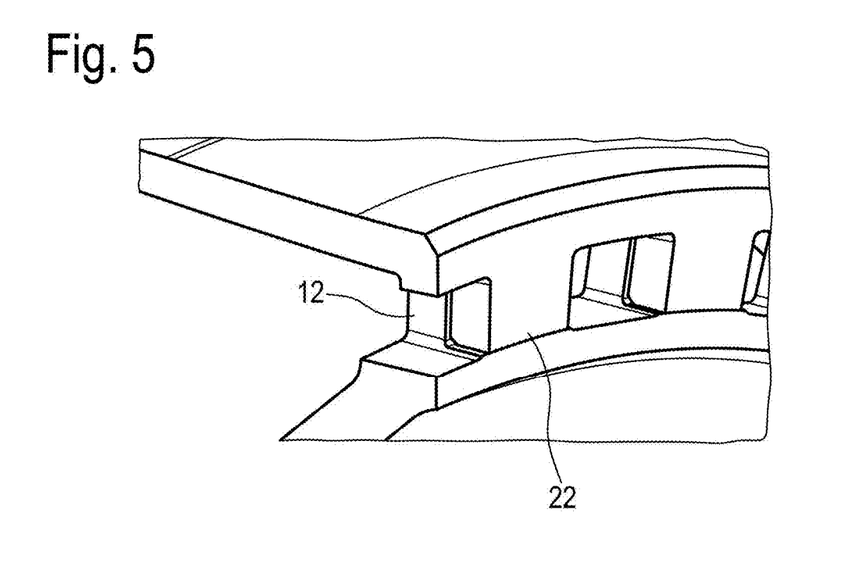
FIG. 5 is the first and second components in FIGS. 2, 3 shown in a second angular position.
Figure 6:
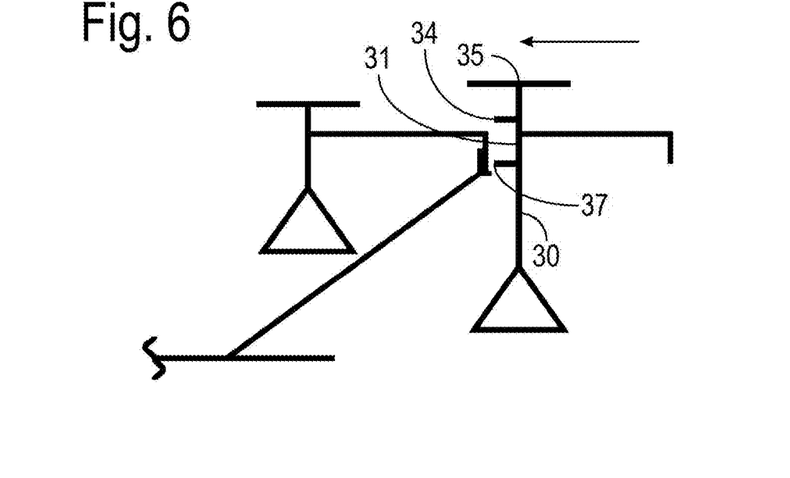
FIG. 6 is a subsequent installation step in FIG. 1, 4 corresponding illustration.
Figure 7:
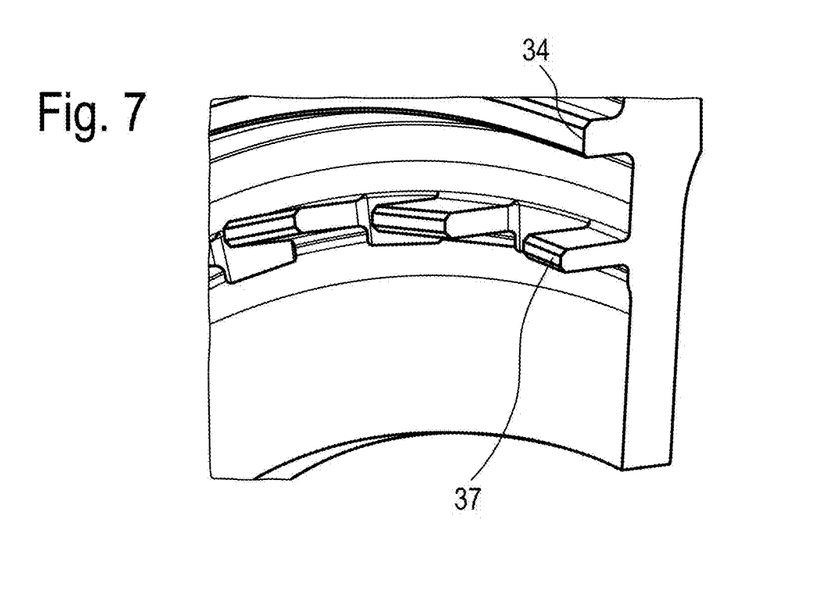
FIG. 7 is a part of a third component of the rotor in a sectioned perspective view.

The first and second components 10, 20 are then rotated relative to one another around the installation or longitudinal or rotational axis of the clamping composite rotor into the second angular position as illustrated in FIG. 4, 5. The second webs 22 slide on fit (seating) surfaces 15 of the cone 10 (see FIG. 3) and form a zero-play radial fit with them. In this position, the first flange 11 is arranged in the axial direction between a constriction 24 of the second component in the form of a smallest inner diameter and the second flange and is at a distance from this constriction, wherein FIG. 1 illustrates that a maximum outer diameter D1 of the first flange 11 is larger than a minimum inner diameter D2 of the constriction.

A third component in the form of another rotating blade disk 30 with a third flange 31 is then arranged by pushing it in the axial direction (horizontally in FIG. 6) onto the components 10, 20. In this case, axial webs 37, which can be formed integrally with the third component 30, pass through the first and second recesses 13, 23 and thus provide an anti-twist protection; in addition, an outer axial projection 34, which is arranged on the third flange 31, covers the second flange 21 radially on the outside. Accordingly, the third component 30 secures the second component 20 in a radially positive manner. This is illustrated in FIGS. 6-10.

Figure 8:
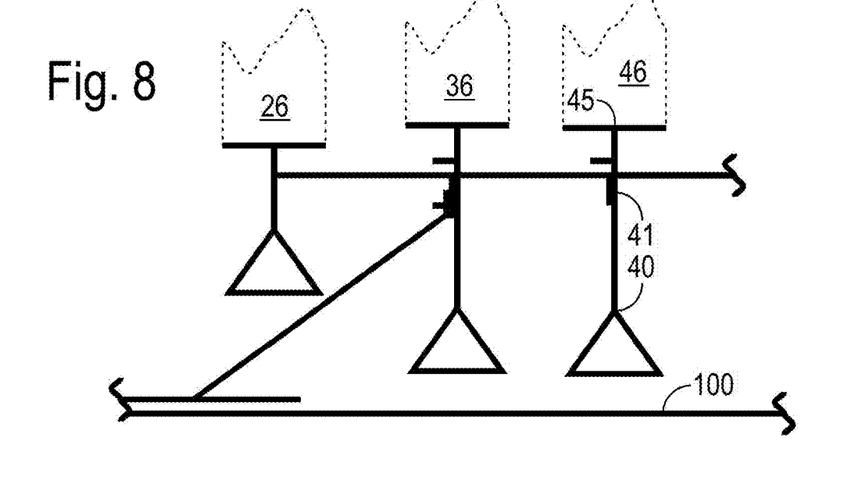
FIG. 8 is the installed clamping composite rotor in FIGS. 1, 4, 6 corresponding illustration.
Figure 9:
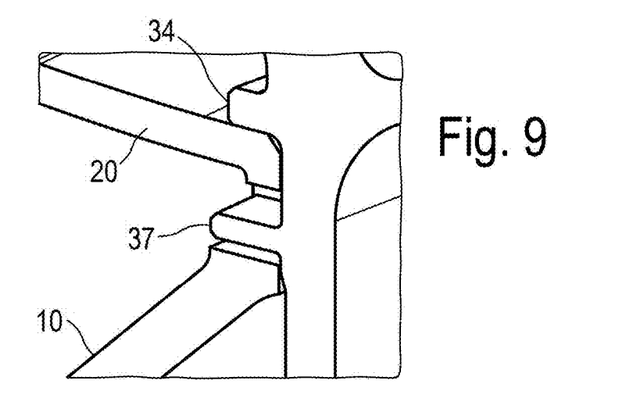
FIG. 9 is the first, second and third components in a sectioned perspective view.
Figure 10:
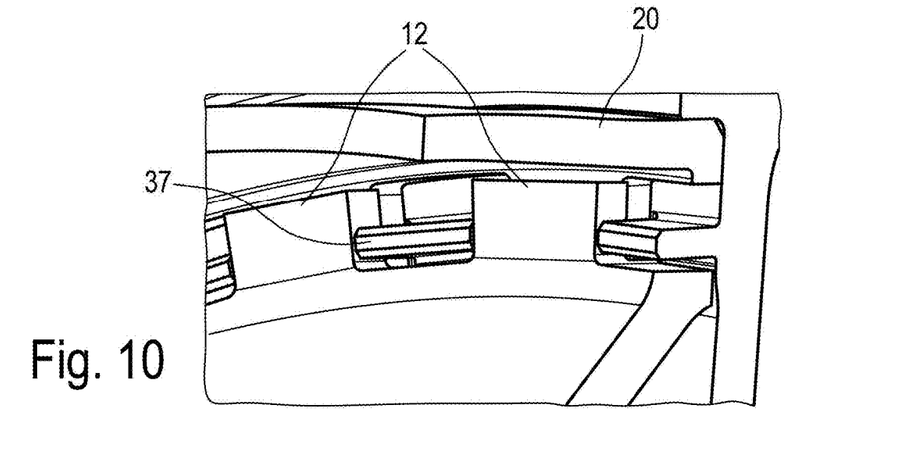
FIG. 10 is the first, second and third components in another sectional perspective view.

Subsequently, additional components, in particular a fourth component in the form of an additional rotating blade disk 40 with a fourth flange 41, can be arranged accordingly and then axially clamped together to form the clamping composite rotor using a tension rod device 100, as illustrated in FIG. 8. In this case, 25 (cf. FIG. 1), 35 (cf. FIG. 6) and 45 (cf. FIG. 8) each mark interfaces for fastening rotating blades 26, 36 and 46, respectively, which are indicated by dashed lines in FIG. 8.

Dismantling is done in the reverse order.

In the present disclosure, in general, "has an X" does not imply an exhaustive list, but is a short form of "has at least one X" and also includes "has two or more Xs" and "has Y in addition to X". Although exemplary embodiments have been explained in the preceding description, it should be noted that several modifications are possible.

In particular, the axial projections 37 can be arranged on a separate ring (not shown) instead of integrating them with the third component 30, or they can be omitted.

Alternatively, the projections can also be designed as bolts that penetrate the third component.

It should also be noted that the exemplary embodiments are merely examples that are not intended to limit the scope of protection, applications and structure in any way. Rather, the preceding description provides the skilled person with a guide for the implementation of at least one exemplary embodiment, whereby various changes, in particular with regard to the function and arrangement of the described components, can be made without departing from the scope of protection as it results from the claims and their equivalent combinations of characteristics.

What is claimed is:

1. A clamping composite rotor for a gas turbine, comprising:
   a first component with a first flange having first radial webs and first recesses between each of two neighboring first webs in the circumferential direction;
   a second component with a second flange having second radial webs and second recesses between each of two neighboring second webs in the circumferential direction; and
   a third component having a third flange;
   wherein the first component is a cone, and the second component is a configured and arranged to support rotating blades of the gas turbine and the third component is configured and arranged to support rotating blades of the gas turbine;
   wherein the first and the second component are configured and arranged that, in an initial installation position, the first and second component form a first angular position relative to each other around an installation and/or longitudinal rotational axis of the clamping composite rotor and by an axial displacement of the first and second components relative to each other and parallel to this axis;
   wherein the second webs pass through the first recesses and the first webs pass through the second recesses in the axial direction;
   wherein, in the installed clamping composite assembly, the first and second components have a second angular position relative to one another around the installation and/or longitudinal rotational axis of the clamping composite rotor, in which the second webs at least partially overlap the first webs in the circumferential direction; and
   the second webs are arranged in the axial direction between the first webs and the third flange and are clamped by a separate tension rod device of the rotor;
   wherein the tension rod device passes through the first component, second component and third component in the axial direction and is supported in the axial direction directly or indirectly on one of the sides of the first component facing away from the third component.

2. The clamping composite rotor according to claim 1, wherein the first recesses open radially outwards and the second recesses open radially inwards and/or the second component overlaps the first webs in the axial direction.

3. The clamping composite rotor according to claim 1, wherein a maximum outer diameter of the first flange is larger than a minimum inner diameter of a constriction of the second component, wherein the first flange is arranged in the axial direction between the constriction and the second flange and/or is at a distance from the constriction.

4. The clamping composite rotor according to claim 1, wherein axial webs engage in the first and/or second recesses.

5. The clamping composite rotor according to claim 4, wherein at least two of the axial webs are connected to one another or are integrally formed and/or arranged on the third or an additional component.

6. The clamping composite rotor according to claim 1, wherein there is a zero-play radial fit between the second flange and the first component and/or between the first flange and the second component.

7. The clamping composite rotor according to claim 1, wherein a fourth component with a fourth radial flange is arranged in the axial direction on a side of the third flange facing away from the first and/or second flange, wherein the first webs, second webs, the third flange and the fourth flange are clamped by the tension rod device.

8. The clamping composite rotor according to claim 1, wherein the third component secures the second component in a radially form-fitting manner with at least one outer axial projection being arranged on the third flange, which surrounds the second flange radially outward.

9. The clamping composite rotor according to claim 1, wherein the clamping composite rotor is configured and arranged in a gas turbine rotor, a turbine, compressor assembly and/or an aircraft engine.

10. A method for installing the clamping composite rotor of claim 1, comprising the steps of:
   arranging the first and second components in the initial installation position;
   displacing the first and second components relative to each other parallel to the installation and/or longitudinal axis of the clamping assembly, so that the second webs are guided through the first recesses and the first webs through the second recesses in the axial direction;
rotating the first and second components relative to each other around this axis into the second angular position;
arranging the third component; and
clamping the second webs in the axial direction between the first webs and the third flange by the tension rod device.

11. The method according to claim 10, wherein a fourth component is arranged and then the first webs, second webs, the third flange and the fourth flange are clamped by the tension rod device.

12. A method for dismantling a clamping composite rotor according to claim 1, comprising the steps of:
loosening a clamping of the second webs in the axial direction between the first webs and the third flange by the tension rod device;
removing the third component;
rotating the first and second components relative to each other around the assembly axis and/or longitudinal axis of the clamping assembly into the first angular position;
displacing the first and second components relative to each other parallel to this axis, so that the second webs are passed through the first recesses and the first webs are passed through the second recesses in the axial direction; and
separating the first and second components from each other.

* * * * *